UNITED STATES PATENT OFFICE.

DONATO COZZOLINO, OF LOS ANGELES, CALIFORNIA.

BEVERAGE.

1,250,095. Specification of Letters Patent. Patented Dec. 11, 1917.

No Drawing. Application filed January 5, 1917. Serial No. 140,721.

*To all whom it may concern:*

Be it known that I, DONATO COZZOLINO, a subject of the King of Italy, and a resident of Los Angeles, in the county of Los Angeles and State of California, have invented a new and Improved Beverage, of which the following is a full, clear, and exact description.

My invention relates to a fermented beverage, similar to beer, in which the malt is totally replaced by fruits, the term "fruits" including berries.

The object of the invention is to produce beverages possessing a great variety of flavors and colors which will make the drink more attractive.

Malt is an essential of beer making. The raw cereals contribute only starch to beer; malt contributes not only starch but soluble ferments, the peptones, the desirable albuminoids, and the enzyms, which are necessary for the conversion of the starch of the raw cereals, and the starch of the malt, into dextrin and dextrose. The dextrose acted upon by the yeast forms the alcohol and the carbonic acid gas. The dextrin produces the foam and the palatableness of the beer. If no malt is employed the starch of the raw cereals will not change into dextrose and dextrin, and, therefore, there would be no chance for the yeast to convert the dextrose into alcohol and carbonic acid gas.

By substituting for the malt some fruit, as, for example, fresh grapes, or any other fruit or berry, I supply the levulose, which is of the same nature as the dextrose. The fruit also supplies the organic acids, which, in the boiling process, will change the starches of the raw cereals into fermentable sugars and into dextrins, making possible the action of the saccharomyces ellipsoideous and saccharomyces cerevisia for the formation of the alcohol and carbonic acid gas. The fruits will also bring to the beverage the organic salts, such as potassium bitartrate the pectines, and the organic acids, such as citric, tartaric and malic which are now absent from beer.

The introduction of organic acids and organic salts will considerably increase the healthfulness of the beverage and will also increase its palatableness. They will also make the beverage more attractive, by its color, due to the color of the fruits used.

As an illustration of such a beverage, the following may be taken: 1000 pounds of cornstarch is diluted to milk of starch with about 2000 pounds of water. 1000 pounds of grape juice or apple juice is boiled in an autoclave. The milk of starch is run into this boiling juice of grapes or apples, and then the boiling is continued under pressure of about one atmosphere until the starch is converted into dextrose and dextrin. It will take about one hour to accomplish this. The iodin test is applied, and as soon as the starch has been converted into dextrin and dextrose the boiling is stopped.

The density of the resulting syrup is about 12 Baumé.

This wort is boiled. During the boiling the hops are added to insolubilize the undesirable albuminoids coagulating them, to flavor the wort with the hop oil, and to impart keeping qualities to the beverage through the hop resins which act as preservatives in the same manner as in beer making. The boiling will last about three hours, and the wort thus prepared and sterilized is cooled and run into fermenting casks. If bottom fermentation is desired the wort is cooled to about 43° F. On the other hand, if top fermentation is desired, it is cooled to 57° F. Yeast is added and the wort is fermented in the usual way. All other operations are similar to those of beer making.

Although reference has been made to grapes, any fruit, including berries, can be used for the purpose, or their juices, syrups, or fermented musts.

The beverage will generally be of a red color, or any of the shades of red. A beverage having such a color is very attractive, although very similar to beers of amber color. My beverage will also have a red foam. This red foam and color is obtained from fruits, berries, or other coloring matter. It is self-evident that if coloring matter is used it will be of a nature approved by the pure food laws.

I claim:

1. A fermented beverage made from raw cereals, hops, and fruit, in a manner substantially as described.

2. A fermented beverage made from starch flavored with hops and fruit juice, all fermented by yeast in a manner substantially as described.

3. A fermented beverage made from glucose or dextrose, juice of fruits, and hops, all fermented by yeast.

4. A fermented beverage made from dextrose obtained from starch, fruit juice adapted to produce a red colored beverage, and hops, all fermented so that the beverage is adapted to produce a red foam.

5. A process of making beverages, which consists in saccharifying starch by boiling fruit juice to form a wort, then hopping and fermenting the wort.

DONATO COZZOLINO.